United States Patent [19]
Tanaka et al.

[11] Patent Number: 6,120,379
[45] Date of Patent: Sep. 19, 2000

[54] PORTABLE GAME MACHINE AND PORTABLE GAME MACHINE CARTRIDGE

[75] Inventors: Hirokazu Tanaka; Takashi Ohno; Satoru Okada; Masahiko Ota; Masato Kuwahara, all of Kyoto, Japan

[73] Assignee: Nintendo Co., Ltd., Kyoto-fu, Japan

[21] Appl. No.: 09/026,804

[22] Filed: Feb. 20, 1998

[30] Foreign Application Priority Data

Nov. 5, 1997 [JP] Japan .................................. 9-320430

[51] Int. Cl.[7] .............................. A63F 9/24; G03B 17/00; G03B 29/00
[52] U.S. Cl. .......................... 463/44; 463/46; 273/148 B; 396/97; 396/429
[58] Field of Search .................................... 463/1, 30–31, 463/44–47; 396/29, 297, 429, 439; 348/49, 61, 73, 906, 909; 273/148 B

[56] References Cited

U.S. PATENT DOCUMENTS

| | | |
|---|---|---|
| 4,521,014 | 6/1985 | Sitrick ........................................ 463/31 |
| 4,572,509 | 2/1986 | Sitrick ........................................ 463/31 |
| 4,688,105 | 8/1987 | Bloch et al. . |
| 4,710,873 | 12/1987 | Breslow et al. ........................... 463/31 |
| 5,184,830 | 2/1993 | Okada et al. .............................. 463/31 |
| 5,553,864 | 9/1996 | Sitrick ....................................... 463/31 |
| 5,595,389 | 1/1997 | Parulski et al. ............................ 463/31 |
| 5,810,665 | 9/1998 | Takemoto et al. ......................... 463/31 |
| 5,815,411 | 9/1998 | Ellenby et al. . |

FOREIGN PATENT DOCUMENTS

WO 97/08888 3/1997 WIPO .

*Primary Examiner*—Valencia Martin-Wallace
*Assistant Examiner*—Mark A. Sager
*Attorney, Agent, or Firm*—Nixon & Vanderhye P.C.

[57] ABSTRACT

In a portable game machine 10, formed on the upper portion of a body portion 20 is a camera portion 30. An image display device 22 is arranged on one main surpace of the body portion 20, and operating switches 23, 24, etc., are arranged on other areas. The camera portion 30 is rotatably supported to the body portion 20, and a user can shoot images in both forward and backward directions when viewed from the user. Preferably, the camera portion 30 is supported having a prescribed angle to the body portion 20 so that its focal axis tilts with respect to main surfaces of the body portion 20.

17 Claims, 10 Drawing Sheets

PORTABLE GAME MACHINE AND PORTABLE GAME MACHINE CARTRIDGE

BACKGROUND OF THE INVENTION

1. Field of the Invention

This invention relates to portable game machines and portable game machine cartridges, and more specifically to a portable game machine with a camera capable of reading a shot picture as an image and displaying it on a display device and a portable game machine cartridge removably attached to the portable game machine with the display device.

2. Description of the Background Art

As portable game machines with an image display device (or liquid crystal display device), a portable game machine manufactured and sold by the applicant of the present application (product name: "Game Boy") is known, for example. This portable game machine accommodates in a removable cartridge a semiconductor memory (such as ROM, EP-ROM, etc.) storing a program which differs according to the type of game, allowing a user to enjoy different games by exchanging cartridges.

Further, also known is a video camera which records pictures shot by a camera on a video tape. The video camera converts the pictures shot through a lens into digital signals to record the shot pictures as they are on a magnetic tape or a magnetic disk in order of shooting. The lens points in the forward direction when viewed from the user.

However, the conventional portable game machine can only execute the game program in the cartridge inserted therein, and cannot shoot and display the surrounding images of the user. In addition, the cartridge used for the potable game machine simply stores the game program, and the user cannot read and display a desired image.

On the other hand, as the video camera, a video camera which records shot pictures on a video tape is known. However, the video camera costs several hundred thousand yen, which is expensive, and therefore it is impossible to use it as a toy for children. Moreover, the video camera is to record the shot pictures as moving pictures, therefore it is impossible to display the picture as a still picture and use still pictures for some picture processing, or if possible, its usage is complicated. Further, the video camera is to shoot the forward images of the user, and therefore it is difficult to display the user himself/herself on the image display device and look over behind the user.

SUMMARY OF THE INVENTION

Therefore, a main object of the preset invention is to provide a portable game machine and a portable game machine cartridge capable of shooting and displaying an arbitrary surrounding images of a user, and also being inexpensive, usable even for a child and with ease of usage.

Another object of the present invention is to provide a portable game machine and a portable game machine cartridge capable of processing or working on a shot image as a still picture, extending the range of use for entertainment, and expanding entertainment value.

Still another object of the present invention is to provide a portable game machine and a portable game machine cartridge allowing a user to view the shot image even if the shooting direction based on a position of a camera changes and also to view the image with ease.

The present invention has the following features to achieve the objects above.

A first aspect of the present invention is directed to a portable game machine with an external storage cartridge storing at least a game program removably attached, comprising:

a housing having a size capable of being held by both hands, when held by a user for operation, one main surface thereof opposing to a user and an other main surface thereof pointing ahead of the user;

an image display portion formed on the one main surface of the housing;

first operating means arranged on an area except the image display portion on the one main surface of the housing and in the vicinity of one side surface of the housing and used for instructing a moving direction of a character of a game;

second operating means arranged on an area except the image display portion on the one main surface of the housing and in the vicinity of an other side surface and used for instructing a motion other than instructing the moving direction of the character of the game;

a connecting portion for removably connecting the external storage cartridge to the housing;

a camera portion for shooting surrounding images in a pointing direction;

a supporting portion holding the camera portion at an upper position of the image display portion of the housing and supporting the camera portion rotatably in a lateral direction with respect to the housing;

temporary storage portion for temporarily storing image data of a shot image with the camera portion; and write/read control portion for writing the image data in the temporary storage portion and reading the image data stored in the temporary storage portion to display the image data on the image display portion.

As described above, in accordance with the first aspect, it is possible to obtain a portable game machine capable of shooting and displaying an arbitrary surrounding images of a user, and also being inexpensive, usable even for a child and with ease of usage.

According to a second aspect of the present invention, in the first aspect, the supporting portion rotatably supports the camera portion in an angle range of approximately 180 degrees so as to point the camera portion to both of a forward direction of the one main surface and a backward direction of the other main surface of the housing.

As described above, in accordance with the second aspect, since the camera portion can be rotated in an angle range of approximately 180 degrees, it is possible to shoot both of a forward direction of the one main surface and a backward direction of the other main surface of the housing.

According to a third aspect of the present invention, in the second aspect, the supporting portion rotatably supports the camera portion about a rotation axis tilting at a prescribed angle with respect to the one main surface and the other main surface of the housing.

According to a fourth aspect of the present invention, in the third aspect, a tilt angle of the rotation axis with respect to the one main surface and the other main surface of the housing is selected to be an angle so that an optical axis forms an acute angle with respect to the one main surface when the camera portion is pointed to the forward direction of the one main surface while the optical axis forms an obtuse angle with respect to the other main surface when the camera portion is pointed to the backward direction of the other main surface.

As described above, in accordance with the fourth aspect, the camera portion is supported so that an optical axis forms an acute angle with respect to the one main surface when the camera portion is pointed to the forward direction of the one main surface while the optical axis forms an obtuse angle with respect to the other main surface when the camera portion is pointed to the backward direction of the other main surface. Therefore, even if the shooting direction changes, the user can view the shot image by himself/herself with ease. Further, when shooting in the forward direction of the user and when shooting the user himself/herself or in the backward direction of the user, the user does not have to incline both hands which hold the housing, allowing reduction in the fatigue of wrists and achieving easier usage.

According to a fifth aspect of the present invention, in the first aspect, the camera portion comprises a lens unit;

an image pickup device for converting an optical signal launched through the lens unit into an electrical signal; and a camera substrate on which the image pickup device is placed According to a sixth aspect of the present invention, in the first aspect, the write/read control portion comprises processing portion; and control program storage portion storing a program for controlling writing and reading of image data by being processed by the processing portion.

According to a seventh aspect of the present invention, in the sixth aspect, the temporary storage portion comprises storage areas for storing image data for a plurality of frames, and the control program storage portion stores a program for writing the image data for the plurality of frames shot with the camera portion in each storage area of the temporary storage portion based on at least either one of the first or second operating portion, and reading prescribed image data stored in at least any one of the storage areas to display the image data on the image display portion.

As described above, in accordance with the seventh aspect, it is possible to store the image data of a plurality of shot frames and freely display the image data as required.

An eighth aspect of the present invention is directed to a portable game machine cartridge structured removably from a portable game machine body comprising a housing having a size capable of being held by both hands, when held by a user for operation one main surface thereof opposing to a user and an other main surface thereof pointing ahead of the user; an image display portion formed on the one main surface of the housing; first operating portion arranged on an area except the image display portion on the one main surface of the housing and in the vicinity of one side surface of the housing and used for instructing a moving direction of a character of a game; second operating portion arranged on an area except the image display portion on the one main surface of the housing and in the vicinity of an other side surface and used for instructing a motion other than instructing the moving direction of the character of the game; and processing portion for performing processing based on a program, the cartridge comprising:

a cartridge case;

a camera portion for shooting an image in a prescribed range in a pointing direction;

a supporting portion for holding the camera portion on an upper edge of the cartridge case and supporting the camera portion rotatably in a lateral direction with respect to the housing;

temporary storage portion accommodated in the cartridge case and temporarily storing image data of a shot image with the camera portion;

control program storage portion accommodated in the cartridge case and storing a write/read control program for writing the image data in the temporary storage portion and reading the image data stored in the temporary storage portion to display the image data on the image display portion by being executed by the processing portion.

As described above, in accordance with the eighth aspect, it is possible to expand functions of the portable game machine already on the market. That is, the user does not have to purchase a new portable game machine with a camera portion but only purchases and inserts a portable game cartridge with a camera portion to shoot and display arbitrary surrounding images of the user. As a result, costs for the user is reduced.

According to a ninth aspect of the present invention, in the eighth aspect, the supporting portion rotatably supports the camera portion in an angle range of approximately 180 degrees so as to point the camera portion to both a forward direction of the one main surface and a backward direction of the other main surface of the housing.

As described above, in accordance with the ninth aspect, since the camera portion can be rotated in an angle range of approximately 180 degrees, it is possible to shoot both of a forward direction of the one main surface and a backward direction of the other main surface of the housing.

According to a tenth aspect of the present invention, in the eighth aspect, the supporting portion rotatably supports the camera portion about a rotation axis tilting at a prescribed angle with respect to the one main surface and the other main surface of the housing.

According to an eleventh aspect of the present invention, in the eighth aspect, a tilt angle of the rotation axis with respect to the one main surface and the other main surface of the housing is selected to be an angle so that an optical axis forms an acute angle with respect to the one main surface when the camera portion is pointed to the forward direction of the one main surface while the optical axis forms an obtuse angle with respect to the other main surface when the camera portion is pointed to the backward direction of the other main surface.

As described above, in accordance with the eleventh aspect, the camera portion is supported so that an optical axis forms an acute angle with respect to the one main surface when the camera portion is pointed to the forward direction of the one main surface while the optical axis forms an obtuse angle with respect to the other main surface when the camera portion is pointed to the backward direction of the other main surface. Therefore, even if the shooting direction changes, the user can view the shot image by himself/herself with ease. Further, when shooting in the forward direction of the user and when shooting the user himself/herself or in the backward direction of the user, the user does not have to incline both hands which hold the housing, allowing reduction in the fatigue of wrists and achieving easier usage.

According to a twelfth aspect of the present invention, in the eighth aspect, the camera portion comprises a lens unit;

an image pickup device for converting an optical signal launched through the lens unit into an electrical signal; and a camera substrate on which the image pickup device is placed.

According to a thirteenth aspect of the present invention, in the eighth aspect, the temporary storage portion comprises storage areas for storing image data for a plurality of frames, and the control program storage portion stores a program for writing the image data for the plurality of frames shot with the camera portion in each storage area of the temporary storage portion based on at least either one of the first or second operating portion, and reading prescribed image data stored in at least any one of the storage areas to display the image data on the image display portion.

As described above, in accordance with the thirteenth aspect, it is possible to store the image data of a plurality of shot frames and freely display the image data as required.

According to a fourteenth aspect of the present invention, in the eighth aspect, the cartridge further comprises game program storage portion accommodated in the cartridge case and storing at least a game program;

the game program including character data for the game and including a program for synthesizing the character data and a part of the image data stored in the temporary storage portion and displaying a synthesized data on the image display portion.

As described above, in accordance with the fourteenth aspect, it is possible to process or work on a shot image as a still picture, extending the range of use for entertainment, and expanding entertainment value.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
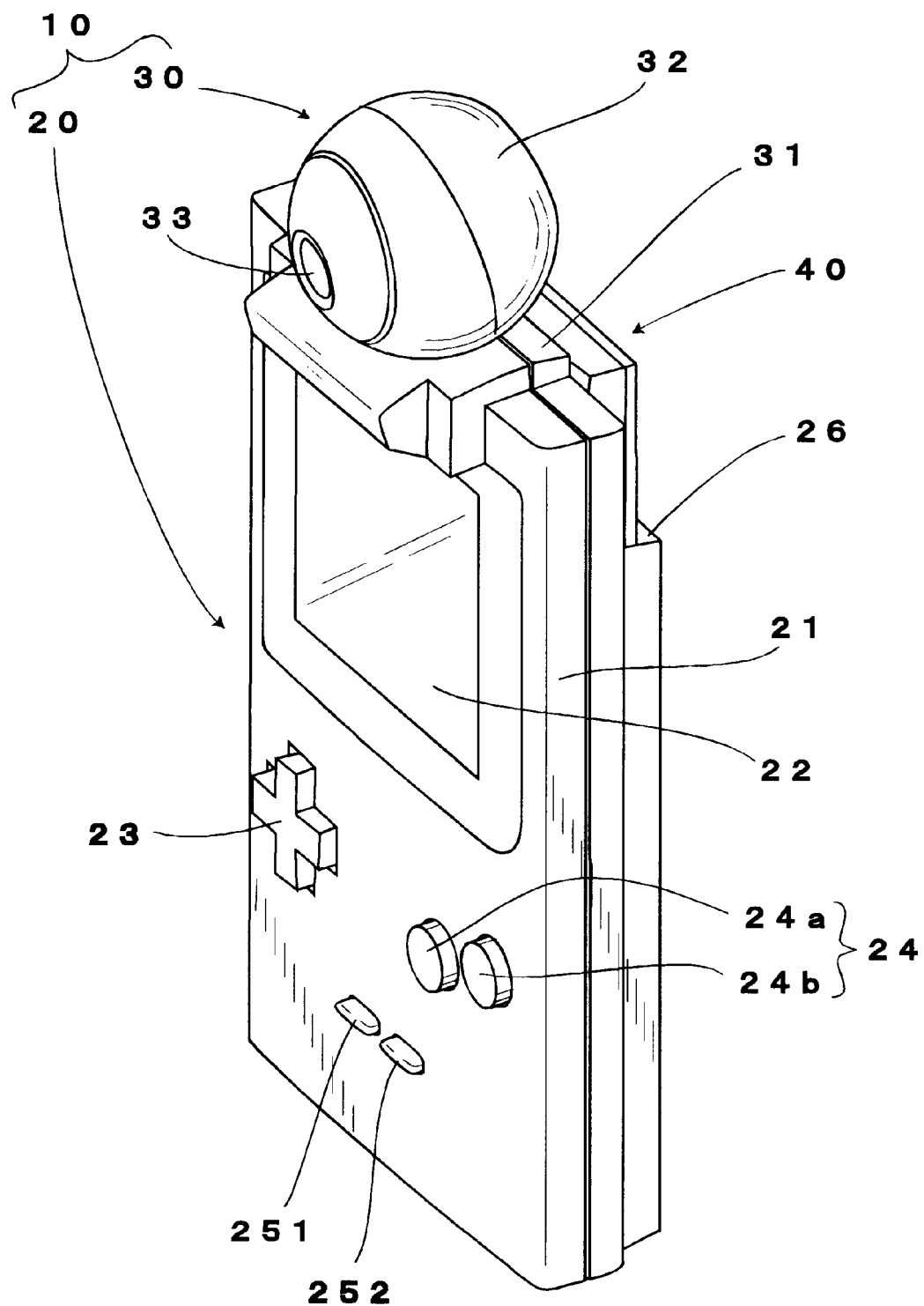
FIG. 1 is an external perspective view showing the structure of a portable game machine according to an embodiment of the present invention.

FIG. 1 is an external perspective view showing the structure of a portable game machine 10 according to an embodiment of the present invention, and specifically showing an example that a camera portion is integrally mounted on a body of the portable game machine. In FIG. 1, the portable game machine 10 of the present embodiment includes a game machine body portion (hereinafter abbreviated simply as "body portion") 20, and a camera portion 30 which is integrally formed on the upper portion side surface (upper edge) when viewed from the front of the body portion 20. Further, a portable game machine cartridge (hereinafter abbreviated as "cartridge") 40 is removably inserted in the upper portion of the rear surface of the body portion 20.

The body portion 20 includes a housing 21 defining the external view of the game machine and also accommodating in its inner space an electrical circuit described later. The housing 21 is formed, for example, in a flat, vertically elongated rectangular parallelepiped shape having a prescribed thickness. Arranged on the upper area of one main surface (front surface) of the housing 21 is an image display device (for example, liquid crystal display device) 22 for displaying game images. In addition, on its lower area, a direction instructing switch (first operating means) 23 is arranged in the vicinity of one side surface (in the drawing, a left side surface), and a motion instructing switch (second operating means) 24 is arranged in the vicinity of the other side surface (in the drawing, a right side surface). The direction instructing switch 23 is used for instructing a moving direction of a character for a game displayed on the image display device 22. The motion instructing switch 24 is used for purposes other than instructing the moving direction of the character (for example, instructing a jump, punch, and motion of grabbing something), and is formed of a plurality of switches 24a and 24b, as required. A start key 251 for instructing a start of the game and a select key 252 for selecting game contents are arranged between the direction instructing switch 23 and the motion instructing switch 24. On the upper area of the other main surface (rear surface) of the housing 21, an insertion opening 26 for receiving the cartridge 40 is provided. A connector (connector 27 shown in FIG. 2 described later) is provided inside the cartridge insertion opening 26 for contacting with a terminal (edge connector) of a substrate included in the cartridge 40 to electrically connect a circuit on the substrate to an electric circuit in the housing 21.

Figure 2:
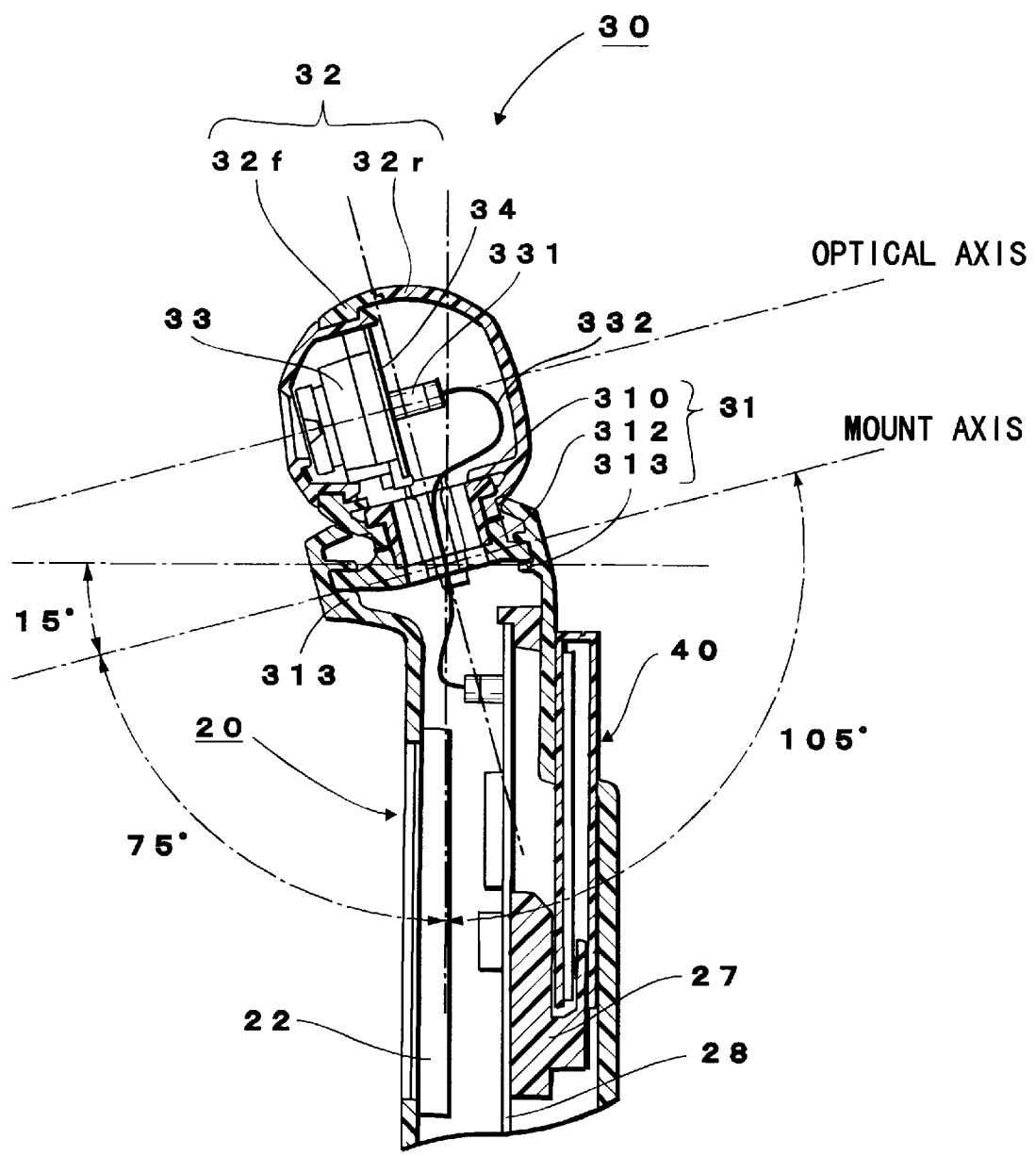
FIG. 2 is a section view showing the detail of a camera portion and its supporting portion shown in FIG. 1.

FIG. 2 is a section view showing the detail of the camera portion 30 and a supporting portion 31 shown in FIG. 1. In FIG. 2, the camera portion 30 is provided with a sphere case 32 containing an image pickup device 33, and is supported rotatably in a lateral direction when viewed from the front by the supporting portion 31. Preferably, as shown in detail in FIGS. 3 to 5 described later, the supporting structure has a rotation angle range of approximately 180 degrees so that a viewing range of the camera portion 30 can turn to both of the forward direction of one main surface (front surface) and the backward direction of the other main surface (rear surface). Further, a mount angle (that is, an angle which a mount axis, which is parallel to an optical axis, of the camera portion 30 tilts with respect to the direction at a right angle to one main surface and the other main surface of the housing 21) is selected in a range of 10 to 45 degrees (preferably, approximately 15 degrees), for example, which is in a upward direction with respect to a depth direction (a direction going through at a right angle from one main surface to the other main surface) of the housing 21. When the mount angle is selected at 15 degrees, for example, the angle which the mount axis forms with respect to one main surface of the housing 21 is 75 degrees (acute angle), while the angle which the mount axis forms with respect to the other main surface of the housing 21 is 105 degrees (obtuse angle). This means that in a state where the user holds the housing 21 with both hands, a viewing direction of the camera portion 30 points diagonally upward with respect to the depth direction of the housing 21 when the image pickup device 33 points to the backward direction of the other main surface, while pointing diagonally downward with respect to the opposite direction of the depth direction when the image pickup device 33 points to the forward direction of one main surface. Therefore, in a state where the user holds the housing 21 with both hands, when the image pickup device 33 points to the forward direction of one main surface, the face of the user who watches the image display device 22 is on the camera portion 30, and in reverse, when the image pickup device 33 points to the backward direction of the other main surface, a person ahead of the user, or a forward view or thing is on the camera portion 30.

In this way, the supporting portion 31 rotatably supports the camera portion 30 in a lateral direction of the body portion 20 to allow the user to easily change the shooting range by only changing the direction of the camera portion 30 and also to shoot and display the forward direction of the user and the user himself/herself (or the backward direction of the user) on the image display device 22 when the rotation range is selected to approximately 180 degrees. Further, the supporting axis with which the supporting portion 31 supports the camera portion 30 is inclined to allow the user to freely adjust the shooting range in the forward direction or on the user side only with slightly inclining both wrists when holding the housing 21 with both hands, without requiring the user to take an uncomfortable position when adjusting, and reducing the fatigue of the wrists.

Figure 3:
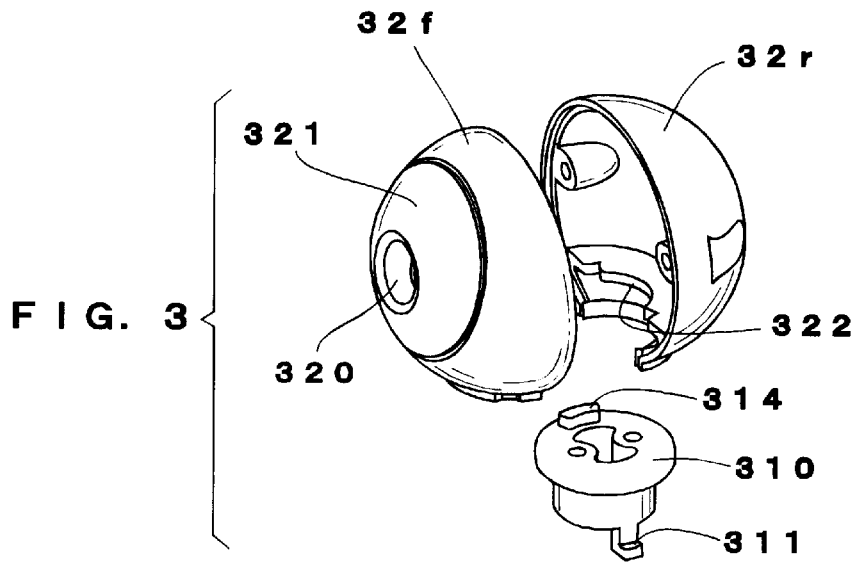
FIG. 3 is a diagram showing the more detailed structure of the camera portion and its supporting portion shown in FIG. 1, and specifically, an exploded perspective view viewed from an image pickup device.
Figure 4:
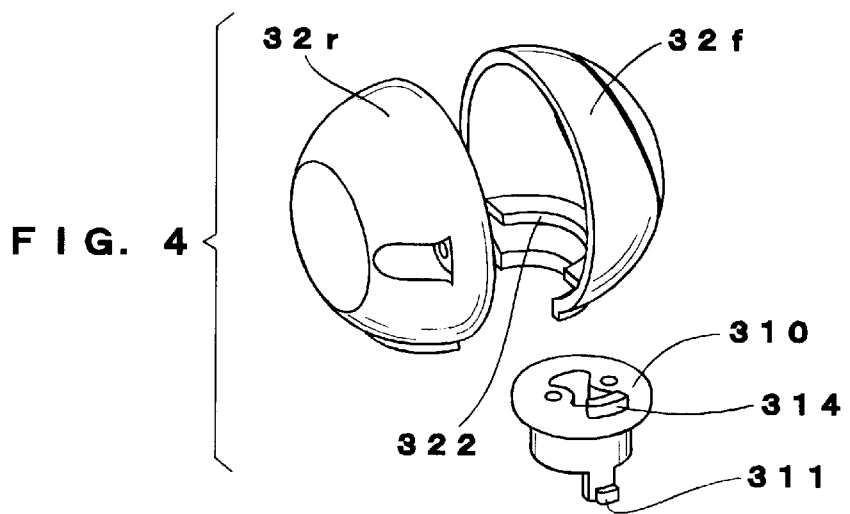
FIG. 4 is a diagram showing the more detailed structure of the camera portion and its supporting portion shown in FIG. 1, and specifically, an exploded perspective view viewed from a rear surface side of the image pickup device.
Figure 5:
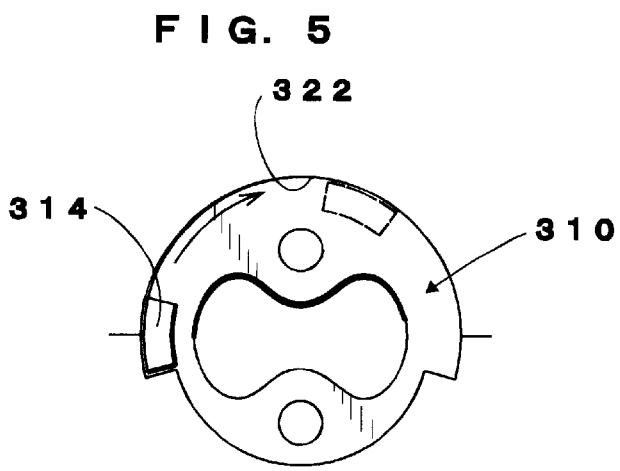
FIG. 5 is a diagram showing the more detailed structure of the camera portion and its supporting portion shown in FIG. 1, and specifically, a top plan view of a supporting body.

FIGS. 3, 4 and 5 are detailed diagrams of the camera portions 30 and the supporting portion 31, and specifically, FIG. 3 is an exploded perspective view of the camera portion 30 viewed from the direction the image pickup device 33 points to, FIG. 4 is an exploded perspective view viewed from the rear surface side of the image pickup device 33, and FIG. 5 is a top plan view of a sphere supporting body 310. Next, referring to FIGS. 2 to 5, described is the detailed structure of the camera portion 30 and the supporting portion 31.

The camera portion 30 includes the sphere case 32. The sphere case 32 is formed in a sphere shape by combining two half-spheres, a front half 32f and a rear half 32r. A front panel 321 on which an opening 320 for launching an optical image therein is formed is mounted on the front half 32f. A camera substrate 34 (refer to FIG. 2) implementing the image pickup device 33 as opposed to the opening 320 is accommodated inside the camera portion 30. The camera substrate 34 on which the image pickup device 33 is placed is fixedly supported by the sphere case 32 so as to have a prescribed angle (15 degrees, for example) with respect to one main surface of the housing 21. A guide groove 322 is formed on a lower inner wall of the sphere case 32. A collar-shaped portion of the sphere supporting body (hereinafter referred to as "supporting body") 310 is engaged in the guide groove 322 to rotatably support the sphere case 32. The supporting body 310 is provided with an engaging protrusion 311 formed on the bottom surface thereof, and is fixed with the engaging protrusion 311 engaged in a fixed supporting body 312. The fixed supporting body 312 is fixedly supported by an inner wall of a supporting protrusion 313. A protrusion 314 is formed on the top surface of the supporting body 310 to regulate the rotational area of the sphere case 32. The supporting portion 31 is thus structured by the supporting body 310, the fixed supporting body 312 and the supporting protrusion 313.

The image pickup device 33 includes a lens (not shown) and an optoelectronic device (for example, a CCD sensor or an area image sensor; not shown) for converting an optical image light-gathered by the lens into electrical signals. The electrical signals converted by the image pickup device 33 are resolved (scanned) into image data for one frame, given through a connector 331 and a cable 332 to a substrate 28 in the body portion 20, and processed by a processing unit (CPU). The details will be described later referring to FIG. 13.

As in another implementation, when the depth dimension of the camera portion 30 is so large as to substantially protrude to one and/or the other main surface, the cartridge 40 might interfere with the camera portion 30 at the current position of the insertion opening 26, and not be allowed to be inserted into the insertion opening 26 because the cartridge 40 is inserted from the upper direction. Therefore, the insertion opening 26 may be provided at a position where the cartridge 40 can be inserted from another direction (for example, the lower direction or the lateral direction). Further, the image pickup device 33 may be provided with an aperture mechanism between the lens and the optoelectronic device as required. In this case, the aperture mechanism is preferably structured to be adjustable from outside of the sphere case 32.

In the above embodiment, while the camera portion 30 and the supporting portion 31 are integrally formed on the upper portion edge of the body portion 20, the camera portion 30 and the supporting portion 31 may be integrally formed on the cartridge 40 inserted in the body portion 20 in the present invention. Described below is, as another embodiment, a case where the camera portion 30 and the supporting portion are integrally formed on the cartridge 40.

Figure 6:
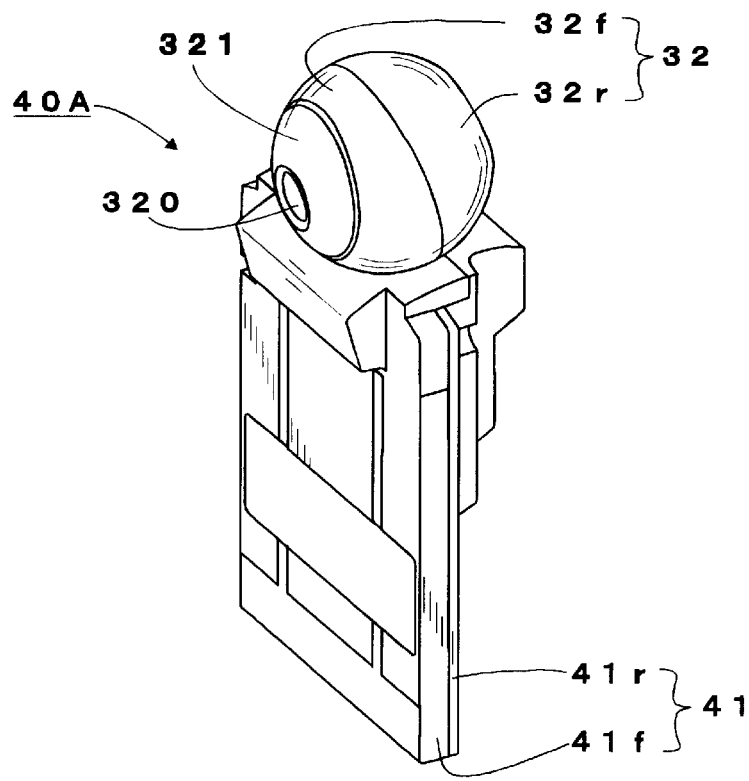
FIG. 6 is a diagram showing the structure of a portable game machine cartridge according to another embodiment of the present invention, and specifically, an external perspective view viewed from its front.
Figure 7:
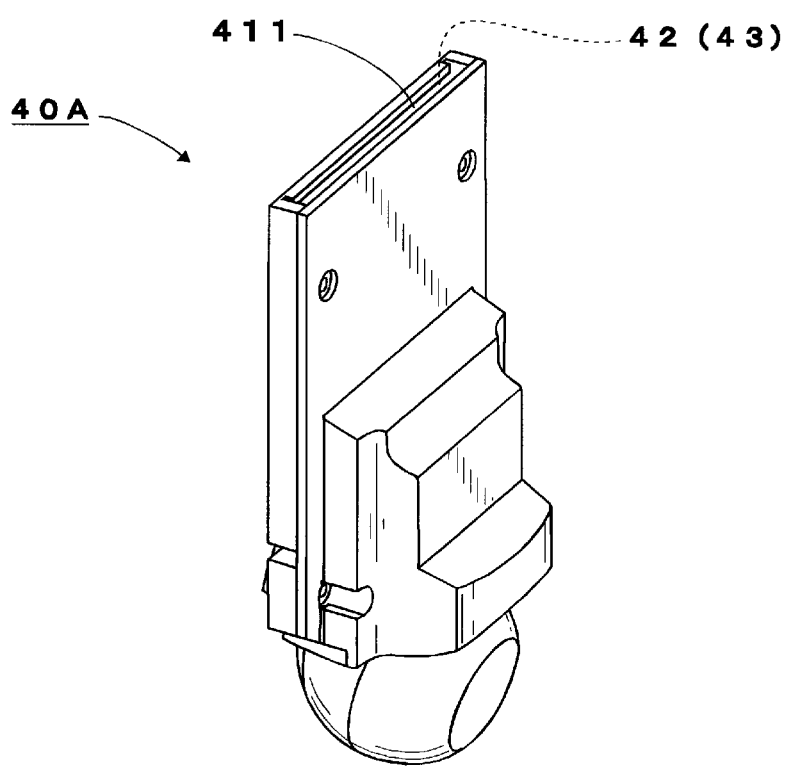
FIG. 7 is an external perspective view of the portable game machine cartridge shown in FIG. 6 viewed from its back.
Figure 8:
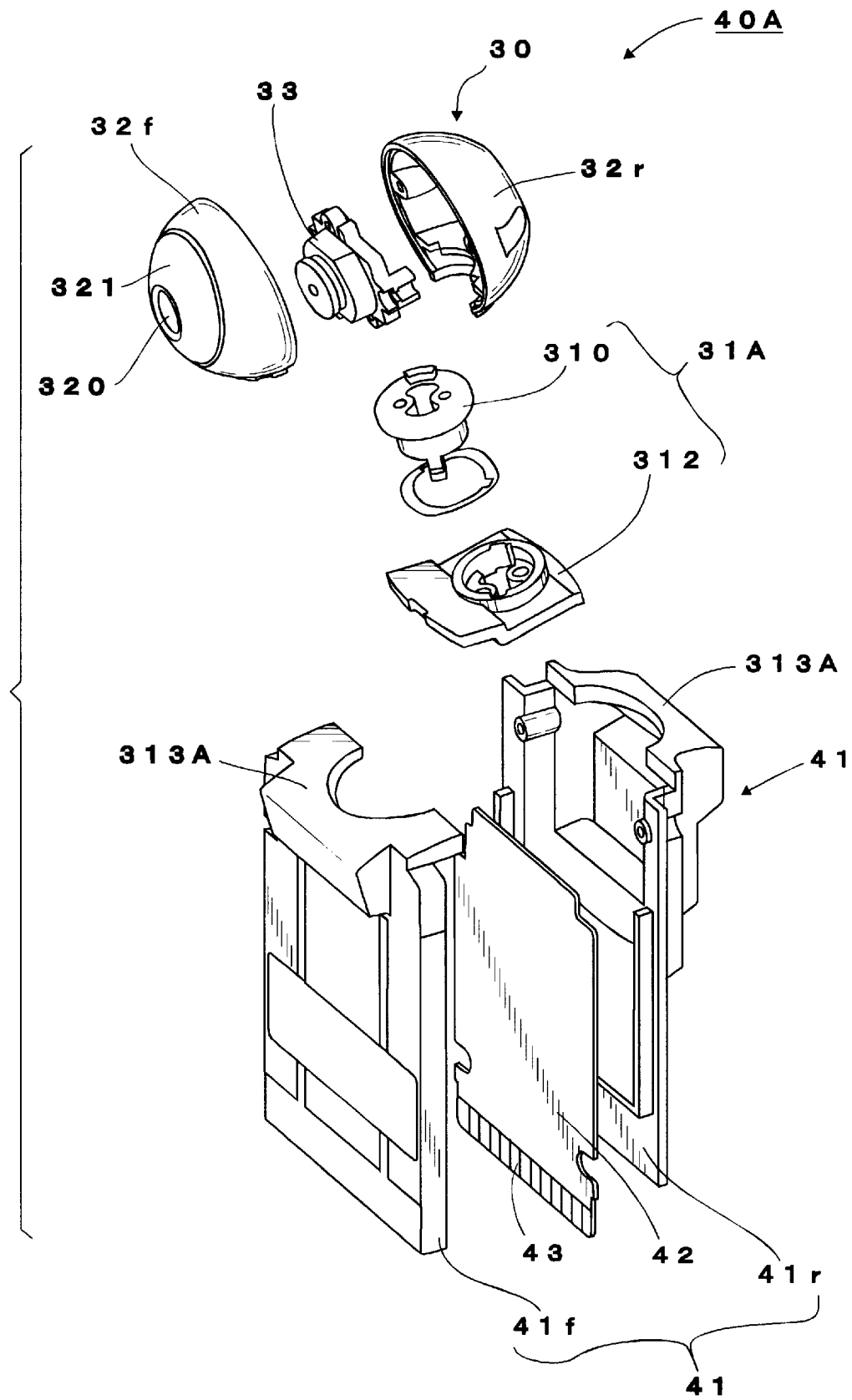
FIG. 8 is an exploded perspective view of the portable game machine cartridge shown in FIG. 6.
Figure 9:
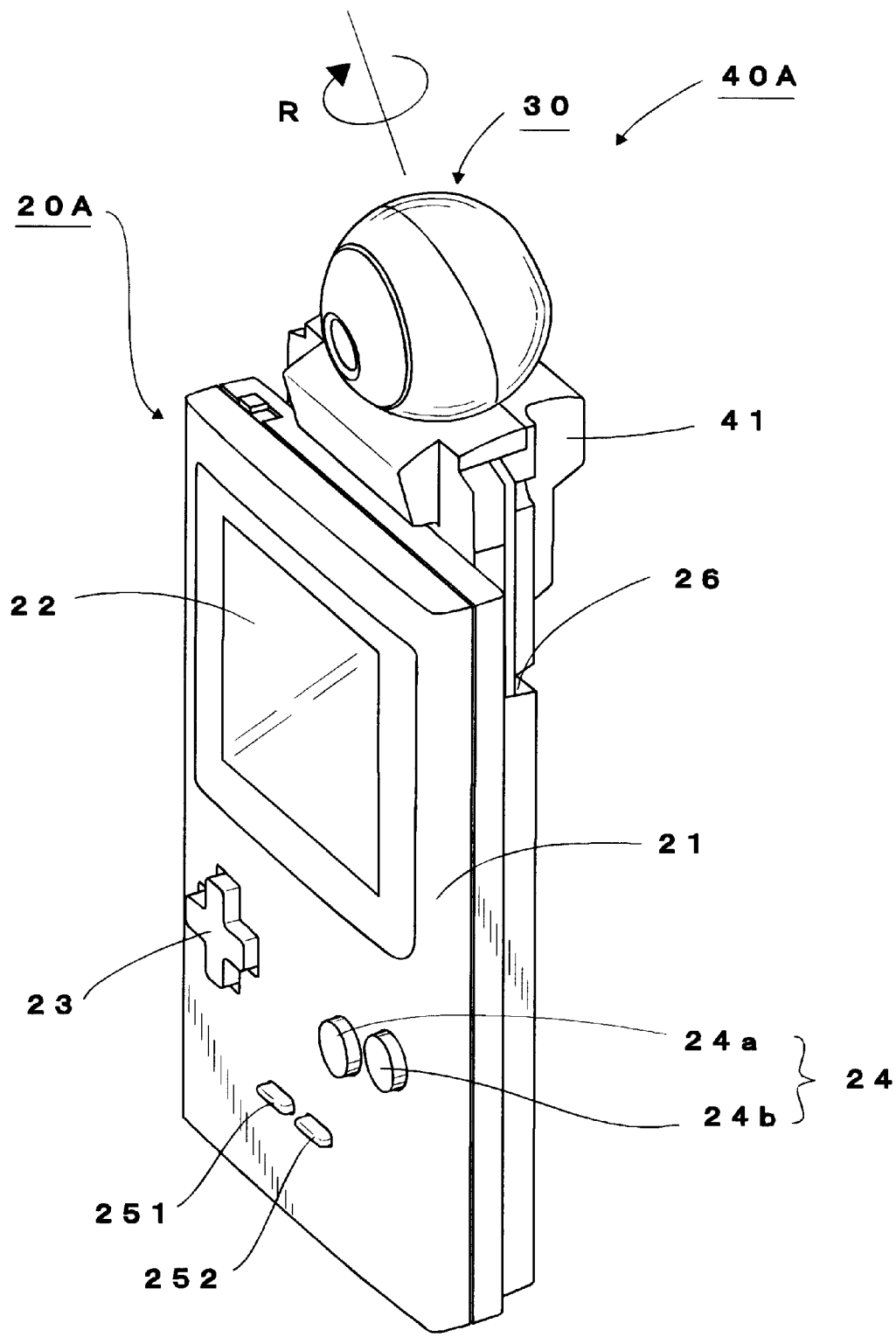
FIG. 9 is a diagram showing a state in which the portable game machine cartridge shown in FIG. 6 is inserted in a body portion.

FIG. 6 and FIG. 7 are external perspective views showing the structure of a portable game machine cartridge (hereinafter abbreviated as "cartridge") 40A according to another embodiment of the present invention, and specifically, FIG. 6 is a perspective view viewed from its front and FIG. 7 is a perspective view viewed from its back. FIG. 8 is an exploded perspective view of the cartridge 40A. FIG. 9 is a diagram showing a state in which the portable game machine cartridge shown in FIG. 6 and FIG. 7 is installed in the body portion 20A.

In FIGS. 6, 7 and 8, the cartridge 40A of the present embodiment includes a cartridge housing (hereinafter abbreviated as "housing") 41 on whose upper portion a supporting portion 31A is formed, and the camera portion 30 rotatably supported by the supporting portion 31A. The housing 41 has a flat rectangular parallelepiped shape combining a front half 41f and a rear half 41r, and a supporting protrusion 313A is formed on the upper portion thereof, and an opening 411 is formed on the lower portion thereof. The housing 41 accommodates a substrate 42 implementing a nonvolafiattile semiconductor memory (ROM, EP-ROM, etc.) and a write-read enable memory (RAM; temporary memory). These memories (ROM, RAM) will be described in detail later referring to a block diagram of FIG. 13. A plurality of terminals 43 are arranged on the lower portion of the substrate 42 to electrically connect implemented electric components to the connector 27 in the body portion 20A (refer to FIG. 9). In addition, each terminal 43 is connected to one or more electric components in a suitable circuit pattern.

As shown in FIG. 9, the cartridge 40A as structured above is inserted in the insertion opening 26 of the body portion 20A. The upper end portion of the body portion 20A has a flat surface without forming the supporting protrusion 313 as in the body portion 20 of the embodiment in FIG. 1.

Since the structure of the camera portion 30 and the other structure of the body portion 20A are the same as those in the embodiment in FIG. 1, the same reference numerals are provided for corresponding portions and their detailed description is omitted.

According to the portable game machine cartridge of the present embodiment, the user newly purchases only a cartridge with a camera portion and inserts it into the game machine body already on the market to shoot and display arbitrary surrounding images of the user, thereby allowing expansion of the functions of the portable game machine at low costs.

Figure 10:
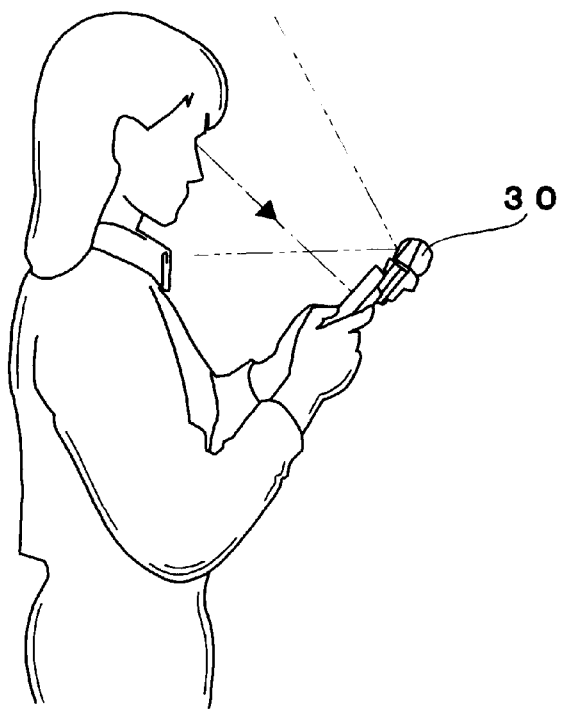
FIG. 10 is a diagram showing an example of a state in use of the portable game machine of one embodiment of the present invention or a state in which the portable game machine cartridge of another embodiment of the present invention is inserted in a portable game machine body in use.
Figure 11:
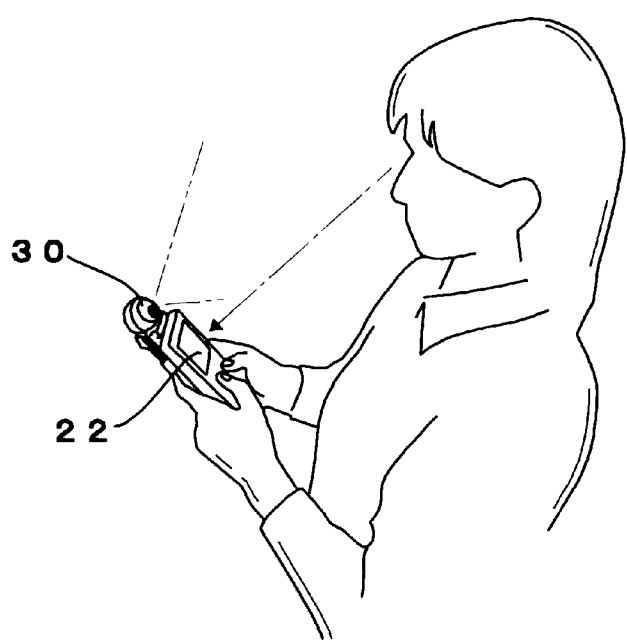
FIG. 11 is a diagram of the state in use shown in FIG. 10 viewed from a different angle.
Figure 12:
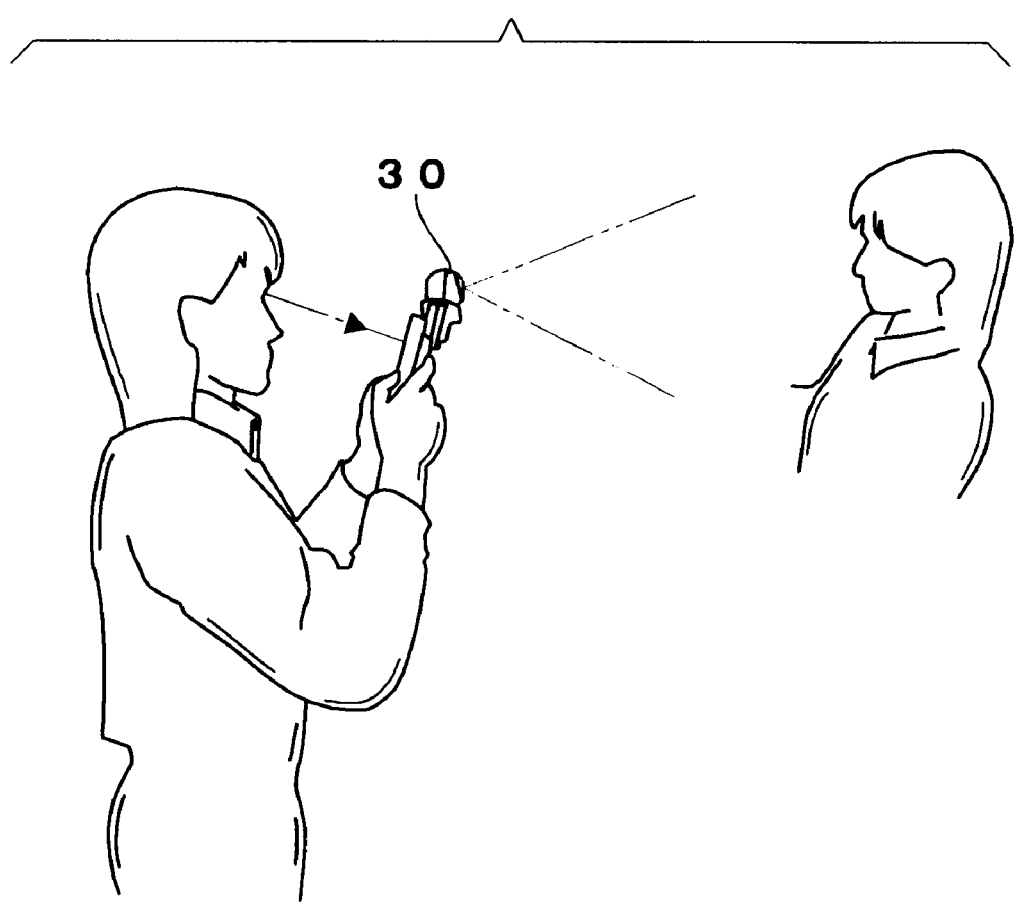
FIG. 12 is a diagram showing another example of a state in use of the portable game machine of one embodiment of the present invention or a state in which the portable game machine cartridge of another embodiment of the present invention is inserted in the portable game machine body in use.

FIGS. 10 to 12 are diagrams showing a state in use of the portable game machine 10 of one embodiment of the present invention or a state in which the portable game machine cartridge 40A is inserted in the portable game machine body in use, and especially, FIGS. 10 and 11 show a state in use when the user shoots himself/herself or backward of himself/herself with the camera portion 30 and FIG. 12 shows a state in use when the user shoots ahead of himself/herself with the camera portion 30.

In a state that the user holds the housing 21 with both hands, when the image pickup device 33 points to the forward direction of one main surface (front surface), as shown in FIGS. 10 and 11, the face of the user who watches the image display device 22 and its surrounding parts are to be shot with the camera portion 30, and the shot image (the face of the user) is displayed on the image display device 22. In reverse, when the user wants to shoot the forward view or person, etc., as shown in FIG. 12, the image pickup device 33 is rotated approximately 180 degrees to point to the backward direction of the other main surface (rear surface). As a result, the user shoots a person ahead of the user or the forward view or objects with the camera portion 30, and the shot image is displayed on the image display device 22.

Figure 13:
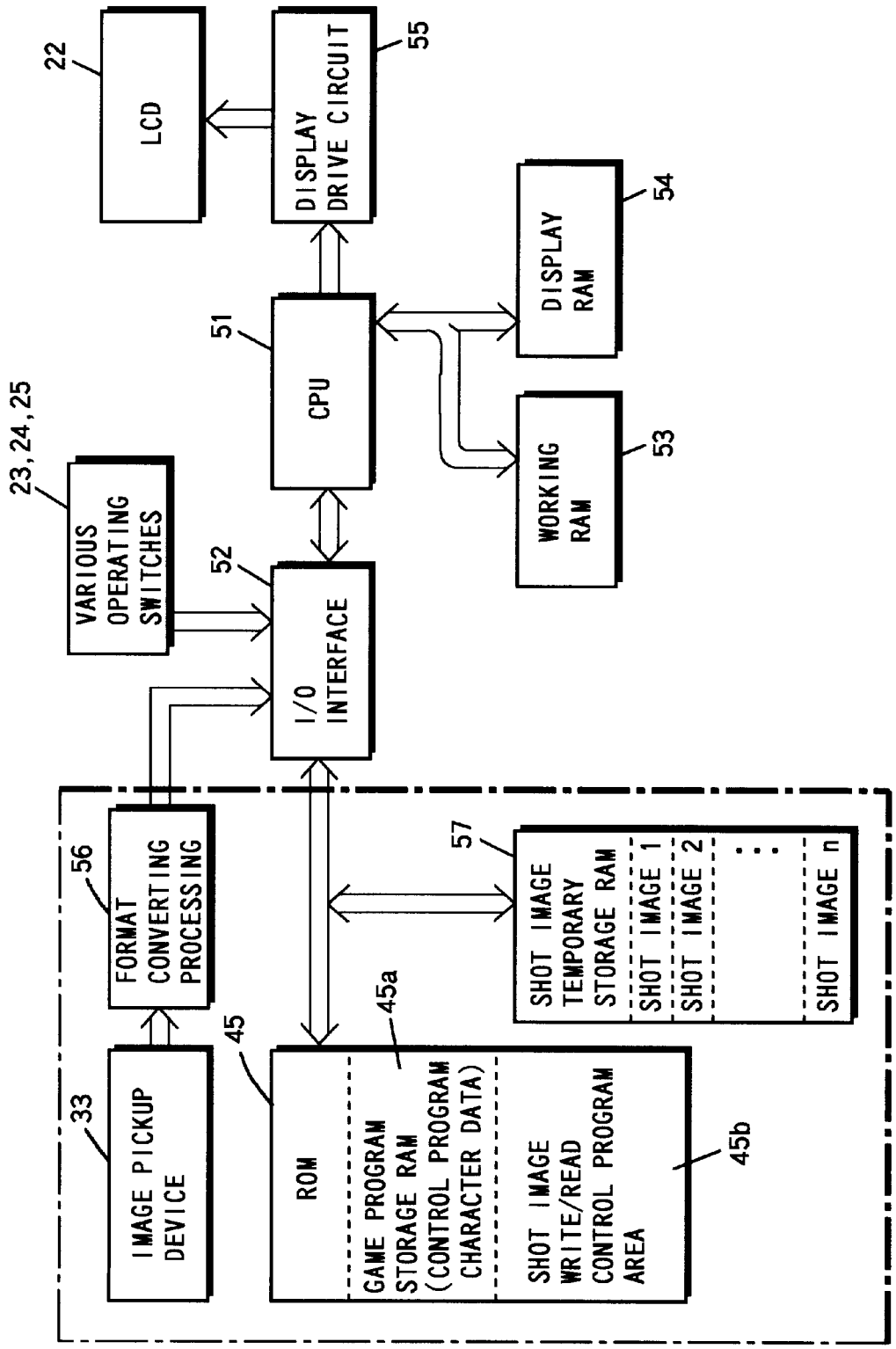
FIG. 13 is a block diagram showing the electrical structure of the portable game machine of one embodiment of the present invention.

FIG. 13 is a block diagram showing the electrical structure of the portable game machine of one embodiment of the present invention. In FIG. 13, the body portion 20 includes a processing unit (CPU) 51. Connected to the CPU 51 are an I/O interface (hereinafter referred to as "interface") 52, a working RAM 53, a display RAM 54 and a display drive circuit 55. Various operating switches 23 to 25 are connected to the interface 52 and a ROM (nonvolatile memory), which is an example of external storage means contained in the cartridge 40 is removably connected to the interface 52. Further, connected to the interface 52 are a format converting processing circuit 56 and a shot image temporary storage RAM (hereinafter referred to as "image RAM") 57, which is an example of temporary storage means, both of which characterize the present embodiment.

Specifically, the working RAM 53 includes a plurality of storage areas (or registers) for temporarily storing various data in game process and for use in storing backup data such as scores, obtained items and lives, for example. In addition, the working RAM 53 includes a frame counter (or frame register) for counting a frame number to be written and/or read in the image RAM 57. The display RAM 54 is used for storing a character code to be displayed at a coordinate position corresponding to each stamp when the displayed screen is divided into a plurality of stamps (minimum display unit of the character) in matrix (for example, 32×30). The image RAM 57 includes storage areas for storing image data for a plurality of (n) frames shot with the image pickup device 33, and includes for each fame a character code storage area corresponding to the plurality of stamps for one frame of the display RAM 54 and an image data storage area storing image data (dot data) of each stamp.

The ROM 45 includes a game program storage area 45a similar to the ROM for use in the conventional game-dedicated cartridge and a shot image write/read control program storage area 45b inherent in the present invention. The game program storage area 45a includes a character data storage area for storing the dot data of a plurality of characters for use in the game according to character codes and a control program storage area for storing a program for display control of the plurality of characters and various processing programs for the game. The shot image write/read control program storage area 45b stores a write (image data read) program which makes the format converting processing circuit 56 perform format conversion of the shot image with the image pickup device 33 and then writes the format-converted image data to the image RAM 57, and a read program which reads the image data stored in the image RAM 57. More preferably, the shot image write/read control program storage area 45b stores a synthesizing program for displaying an image obtained by synthesizing the image data written in the image RAM 57 and the character data for the game.

In a case of the embodiment (the embodiment in FIGS. 6 to 9) where the camera portion 30 is provided on the cartridge 40A side, in addition to the ROM 45, the format converting processing circuit 56 and the image RAM 57 are contained in the cartridge 40.

Figure 14:
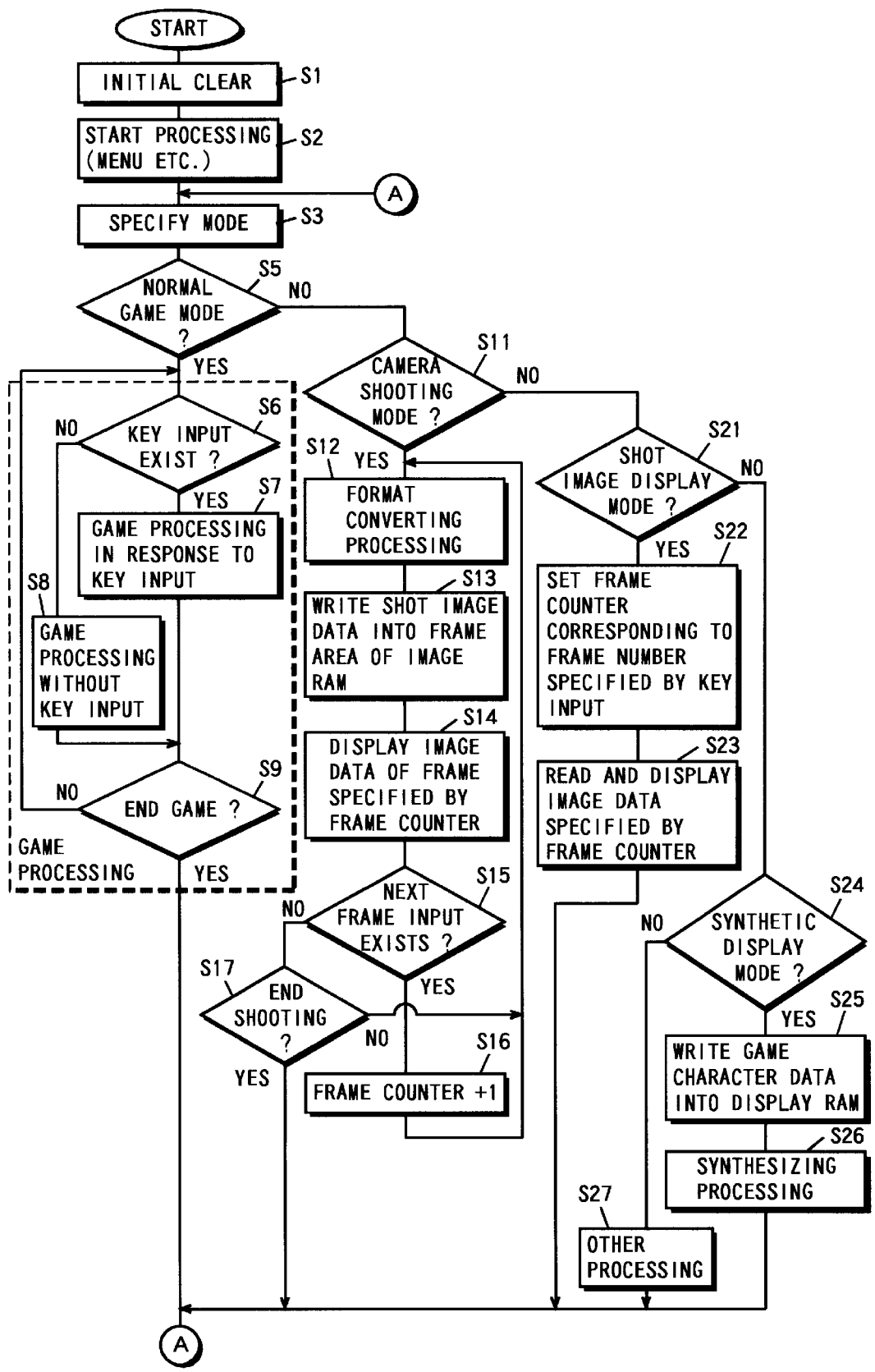
FIG. 14 is a flow chart for describing operation of the portable game machine of one embodiment of the present invention.

FIG. 14 is a flow chart for describing operation of the electrical circuit shown in FIG. 3. Described next is the operation of the electrical circuit shown in FIG. 13 referring to FIG. 14.

When the power of the body portion 20 is on, the CPU 51 starts the following operation based on the program in the ROM 45: First, at step S1, each area of the working RAM 53, the display RAM 54 and the image RAM 57 is initially cleared. Then, at step S2, start processing (menu display, transfer of the backup data to the working RAM 53, etc) is performed. Then, at step S3, when a player specifies an operation mode (game mode, camera shooting mode, shot image display mode, etc.), the corresponding processing to the specified operation mode is performed, which will be described below.

(Normal Game Mode)

In a case of the game mode, at step S3 described above, the game mode is selected. At step S5, when it is determined that the mode is the normal game mode, the CPU 51 executes game processing shown in steps S6 to S9 based on the game program stored in the game program storage area 45a. That is, the CPU 51 determines at step S6 whether or not any key input is performed. When key input exists, the CPU 51 performs at step S7 processing in response to the inputted key based on the game program. For example, when the direction instructing switch 23 is operated, the CPU 51 moves a player character in the instructed direction for display, and when the motion switch 24 is operated, the CPU 51 changes a display state of the player character into a state showing the instructed motion. On the other hand, when no key input is performed, the CPU 51 performs at step S8 game processing without key input. Next, the CPU 51 determines at step S9 whether the game ends or not, returning to step S6 when the game does not end to repeat the operations from steps S6 to S9.

(Camera Shooting Mode: Shot Image Read and Display Mode)

In a case of the camera shooting mode, the shooting mode is selected at step S3 described above. In this case, after determined at step S5 that the mode is not the game mode, it is determined at step S11 that the mode is the camera shooting mode, and then the processing goes on to step S12. At step S12, the CPU 51 provides the format converting processing circuit 56 with a conversion instructing signal. In response, the analog signals of the optical image shot with the image pickup device 33 is format-converted into digital signals by the format converting processing circuit 56. Specifically, when one frame is structured of 32×30 stamps and one stamp is structured of 8×8 dots, the analog signals of the optical image are resolved into coordinate data of the stamps and dot data of the stamps, and then the character data of 8×8 dots is stored corresponding to each stamp character code (or character address) and also a character code to be displayed is generated at a stamp position (address) corresponding to the display coordinates of each item of the character data. At this time, when the resolution of the image display device 22 is four levels of tones for one dot, the dot data of each character is converted into data of 2 bits for one dot.

Next, at step S13, the CPU 51 writes the image data of the shot image into a storage area of the image RAM 57 corresponding to the write frame numbers specified by the frame counter. Therefore, in the frame storage area of the image RAM 57, at addresses corresponding to the character codes, the character data of each character is stored, while at a stamp address corresponding to the display coordinates of each character, the character code of the character to be displayed is stored.

Next, at step S14, the CPU 51 reads the character codes corresponding to each stamp in the storage area of the image RAM 57 corresponding to the write frame number specified by the frame counter in order of the stamp coordinates (in order of X0Y0 . . . X31Y0, X0Y1 . . . X31Y1,X0Y29 . . . X31Y29), and then takes the read character codes as the addresses to sequentially read the corresponding character data. In this way, the sequentially read character data is temporarily stored in the display RAM 54 and displayed through the display drive circuit 55 on the image display device 22. Then, the display data for one frame is repeatedly read for each time required for display processing for one frame, and it thereby seemed as if the same image is fixedly displayed.

Next, at step S15, the CPU 51 determines whether or not next frame input is performed. When determining no input, the CPU 51 determines at the following step S17 whether or not the shooting ends, returning to step S12 when the shooting does not end to repeat operations from steps S12 to S16. On the other hand, at step S15 described above, when determining that shot image input in the next frame exists, the CPU 51 increments a count value of the frame counter by 1 and then returns to step S12, thereby writing the shot image data in the next frame storage area in the image RAM 57. Then, when the shooting ends, the CPU 51 returns to step S3 described above to perform processing of other modes.

(Shot Image Display Mode)

When the shot image previously written in the image RAM 57 is displayed, at step S3 described above, the shot image display mode is selected. This is determined at step S21 and the routine goes on to step S22. At step S22, the numerical value corresponding to the frame number specified by the operation of each switch is set in the frame counter. Next, at step S23, the image data of the frame specified by the frame counter is read from the storage area in the image RAM 57 and then displayed on the image display device 22.

(Shot Image Synthetic Display Mode)

When the shot image and the character for use in the previously program-set game are synthesized and displayed (for example, when portions except a head portion are the character image of the game and the shot image of the head portion is synthesized with the character image), at step S3 described above, a synthetic display mode is selected. Then, after determined at steps S5, S11, and S21 that the mode is not a mode corresponding to each step, it is determined at step S24 that the mode is the synthetic display mode. In response, at steps S25 and S26, the image synthesizing processing is performed. Specifically, at step S25, the CPU 51 previously writes the character dot data corresponding to the character codes of the image display of the game and the character dot data corresponding to each character code in the display RAM 54. Then, at step S26, the CPU 51 cuts out to read the character code of the shot image for synthetic display and the character dot data corresponding to the character code, then writes the character code of the shot image in the coordinates for synthetic display in the display RAM 54 and also writes the character dot data corresponding to the character code in the corresponding area for synthetic display. Then, the CPU 51 reads the character code and the character dot data from the display RAM 54, and thereby the image formed by synthesizing the game image set by the program and the shot image is displayed on the image display device 22.

At step S3, when a mode different from the above described modes is selected, after it is determined at steps S5, S11, S21, and S24 that the mode is not a mode corresponding the above modes, processing corresponding to other mode is performed at step S27.

In the portable game machine and/or the portable game machine cartridge of the present invention, it is possible not only to simply display the shot image on the image display device 22 but also to use the machine and the cartridge for various processes. For example, an optional printer is connected to the body portion 20 to allow easy printing of the captured image. With the printer, the user may use a printing paper made of sticker material to create a sticker of the shot image.

Further, an extended connector for communications is provided for the game machine 10 or the body portion 20 to allow exchange of the shot image captured among a plurality of users.

Further, when the extended connector is used, data can be transferred to a game machine different from the game machine with the camera-inserted cartridge. In this case, the shot image data may be accumulated in a memory (RAM) of a different information processing device or the game machine.

While the invention has been described in detail, the foregoing description is in all aspects illustrative and not restrictive. It is understood that numerous other modifications and variations can be devised without departing from the scope of the invention.

What is claimed is:

1. A portable game machine with an external storage cartridge storing at least a game program removably attached thereto, comprising:

a housing having a size capable of being held by both hands, when held by a user for operation, one main surface thereof opposing to a user and another main surface thereof pointing ahead of the user;

an image display portion formed on the one main surface of said housing;

first operating control mechanism arranged on an area other than said image display portion on the one main surface of said housing and in the vicinity of one side surface of the housing and used for instructing a moving direction of a character of a game;

second operating control mechanism arranged on an area other than said image display portion on the one main surface of said housing and in the vicinity of another side surface and used for instructing a motion other than instructing the moving direction of the character of the game;

a connecting portion for removably connecting said external cartridge to said housing;

said external cartridge further including:

a camera portion for shooting surrounding images in a pointing direction;

a supporting portion holding said camera portion at an upper position of said image display portion of said housing and supporting said camera portion rotatably in a lateral direction with respect to the housing;

a temporary storage for temporarily storing image data of a shot image with said camera portion, said temporary storage including storage areas for storing image data for a plurality of frames; and write/read control circuitry for writing said image data in said temporary storage and reading the image data stored in the temporary storage to display the image data on said image display portion, said write/read control circuitry including a processor and a control program storage storing a program for writing and reading of image data by under control of the processor, wherein the program writes the image data for the plurality of frames shot with the camera portion in each storage area of the temporary storage based on at least one of said first or second operating control mechanism, and reading prescribed image data stored in any one of the storage areas to display the image data on said image display device.

2. The portable game machine according to claim 1, wherein said supporting portion rotatably supports said camera portion in an angle range of approximately 180 degrees so as to point said camera portion to both a forward direction of the one main surface and a backward direction of the other main surface of said housing.

3. The portable game machine according to claim 2, wherein said supporting portion rotatably supports said camera portion about a rotation axis tilting at a prescribed angle with respect to the one main surface and the other main surface of said housing.

4. The portable game machine according to claim 3, wherein a tilt angle of said rotation axis with respect to the one main surface and the other main surface of said housing is selected to be an angle so that an optical axis forms an acute angle with respect to the one main surface when said camera portion is pointed to the forward direction of the one main surface while the optical axis forms an obtuse angle with respect to the other main surface when the camera portion is pointed to the backward direction of the other main surface.

5. The portable game machine according to claim 1, the camera portion comprising:

a lens unit;

an image pickup device for converting an optical signal launched through said lens unit into an electrical signal; and a camera substrate on which said image pickup device is placed.

6. A removable portable game machine cartridge for use with a portable game machine body comprising: a housing having a size capable of being held by both hands, when held by a user for operation, one main surface thereof opposing to a user and another main surface thereof pointing ahead of the user; an image display portion formed on the one surface of said housing; a first operating control mechanism arranged on an area other than said image display portion on the one main surface of said housing and in the vicinity of one side surface of the housing and used for instructing a moving direction of a character of a game; a second operating control mechanism arranged on an area other than said image display portion on the one main surface of said housing and in the vicinity of another side surface and used for instructing a motion other than instructing the moving direction of the character of the game; and a processor for performing processing based on a program, the removable game machine cartridge comprising:

a cartridge case;

a camera portion for shooting an image in a prescribed range in a pointing direction;

a supporting portion for holding said camera portion on an upper edge of said cartridge case and supporting said camera portion rotatably in a lateral direction with respect to said housing;

a temporary storage accommodated in said cartridge case and storing a write/read control program for writing said image data in said temporary storage and reading the image data stored in the temporary storage to display the image data on said image display portion by being executed by said processor.

7. The portable game machine cartridge according to claim 6, wherein said supporting portion rotatably supports said camera portion in an angle range of approximately 180 degrees so as to point said camera portion to both a forward direction of the one main surface and a backward direction of the other main surface of said housing.

8. The portable game machine cartridge according to claim 6, wherein said supporting portion rotatably supports said camera portion about a rotation axis tilting at a prescribed angle with respect to the one main surface and the other main surface of said housing.

9. The portable game machine cartridge according to claim 6, wherein a tilt angle of said rotation axis with respect to the one main surface and the other main surface of said housing is selected to be an angle so that an optical axis forms an acute angle with respect to the one main surface when said camera portion is pointed to the forward direction of the one main surface while the optical axis forms an obtuse angle with respect to the other main surface when the camera portion is pointed to the backward direction of the other main surface.

10. The portable game machine cartridge according to claim 6, wherein said camera portion comprises:

a lens unit;

an image pickup device for converting an optical signal launched through said lens unit into an electrical signal; and a camera substrate on which said image pickup device is placed.

11. The portable game machine cartridge according to claim 6, wherein said temporary storage means comprises storage areas for storing image data for a plurality of frames, and said control program storage means stores a program for writing the image data for the plurality of frames shot with said camera portion in each storage area of said temporary storage means based on at least either one of said first or second operating means, and reading prescribed image data stored in at least any one of the storage areas to display the image data on said image display device.

12. The portable game machine cartridge according to claim 6, further comprising game program storage means accommodated in said cartridge case and storing at least a game program;

said game program including character data for the game and including a program for synthesizing the character data and part of the image data stored in said temporary storage means and displaying a synthesized data on said image display device.

13. A removable game machine cartridge, comprising:

a connector for connecting the game machine cartridge to a game machine;

a camera for capturing images;

a memory for storing images captured by said camera; and a read/write controller for writing image data in the memory and reading the image data stored in the memory to display the image data on an image display portion of the game machine, the read/write controller including a processor and a control program storage for storing a control program that controls the reading and writing of image data being processed by the processor.

14. A removable game machine cartridge according to claim 13, wherein:

said camera is rotatably supported by a housing of the game machine cartridge.

15. A removable game machine cartridge according to claim 14, wherein:

said camera is disposed to enable said camera to rotate about an axis tilting at a prescribed angle with respect to the housing of the game machine cartridge.

16. A removable game machine cartridge according to claim 14, wherein the camera comprises:

a lens;

an image pickup device for converting an optical signal received through the lens to an electrical signal; and a camera substrate on which said image pickup device is disposed.

17. A removable game machine cartridge, comprising:

a program memory storing a program for execution by a game machine;

a camera for capturing images for use by the game machine;

a memory for storing image data captured by said camera;

a controller for controlling the reading and writing of the image data from and to the memory, the controller including a control program memory that stores a program for controlling the reading and writing of the image data.

* * * * *